Sept. 27, 1932.  E. J. KEARNEY ET AL  1,879,692
MACHINE TOOL
Filed Nov. 30, 1928   3 Sheets-Sheet 1

INVENTORS
Edward J Kearney
Joseph B Armitage
BY
Fred G Parsons
ATTORNEY

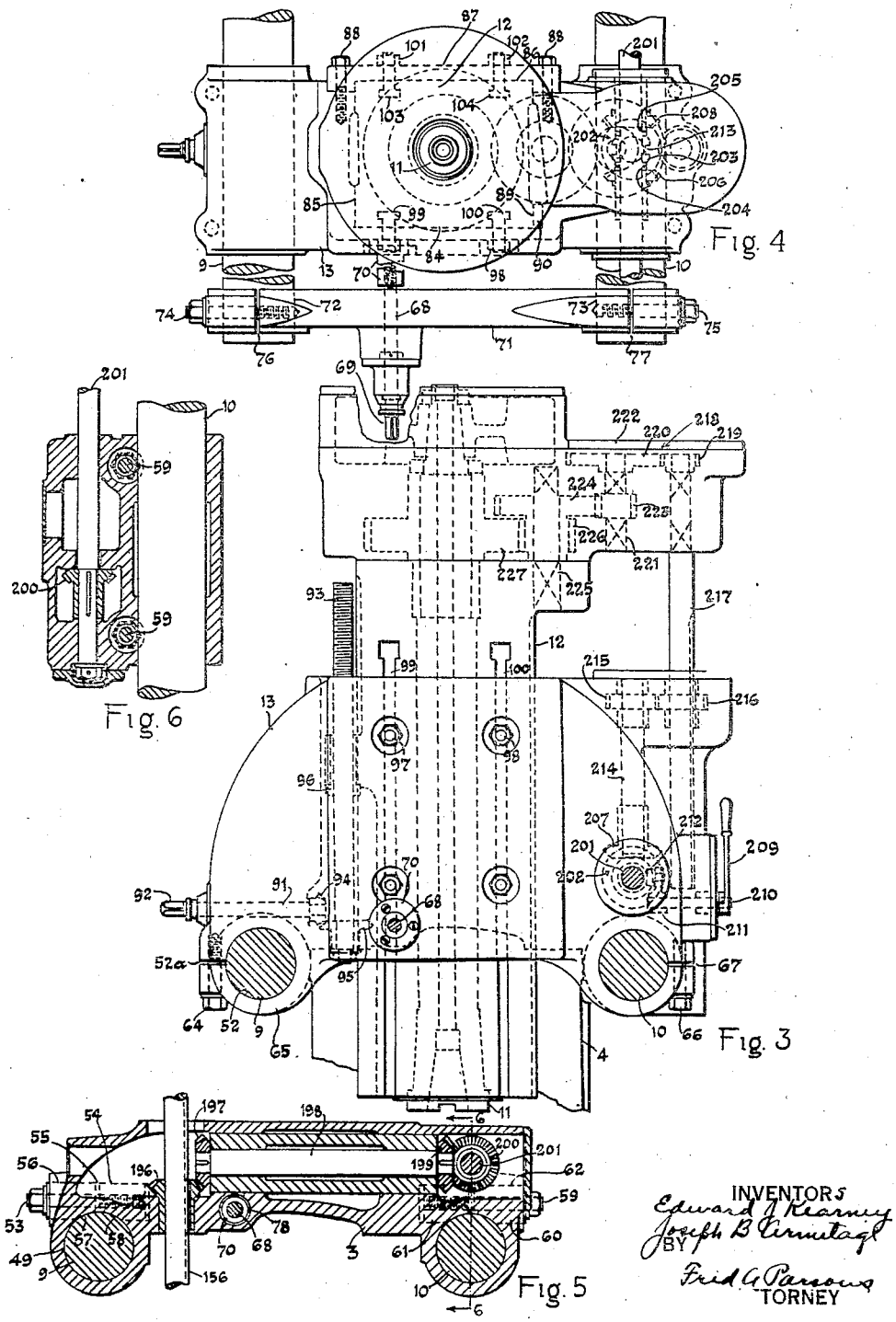

Patented Sept. 27, 1932

1,879,692

UNITED STATES PATENT OFFICE.

EDWARD J. KEARNEY AND JOSEPH B. ARMITAGE, OF WAUWATOSA, WISCONSIN, ASSIGNORS TO KEARNEY & TRECKER CORPORATION, OF WEST ALLIS, WISCONSIN, A CORPORATION OF WISCONSIN

MACHINE TOOL

Application filed November 30, 1928. Serial No. 322,796.

This invention relates to machine tool structure, transmission and control mechanism and particularly to milling machines.

It is an object to devise an improved structure for supporting different cutters for simultaneous operation during a single pass or cutting movement, and capable of convenient adjustments with a maximum of rigidity of support.

A further object is to improve the transmission and control mechanism for such different cutters and the combination of the structure and transmission.

A further object is generally to simplify and improve the construction and operation of machine tools having a plurality of rotary milling cutters simultaneously operative during a single cutting movement, and still other objects will be apparent from this specification.

The invention consists of the construction herein illustrated, described and claimed and in such modifications of the particular structure here illustrated as may be equivalent to the claimed structure.

In the drawings the same reference characters have been used for the same parts in each of the views of which:

Fig. 3 is a partial view taken from line 3—3 of Fig. 1 and enlarged.

Fig. 4 is a plan view of the mechanism shown in Fig. 3, with the addition of certain mechanism not there shown as will be described.

Fig. 5 is a sectional elevation along line 5—5 of Fig. 1 and enlarged.

Fig. 6 is a sectional elevation along line 6—6 of Fig. 5.

Fig. 7 is a partial plan view of that portion of the machine in Fig. 1 directly underneath it in the drawings.

Fig. 8 is a partial elevation taken along line 8—8 of Fig. 1.

Fig. 9 is a partial sectional elevation taken along line 9—9 of Fig. 1.

Figure 1:
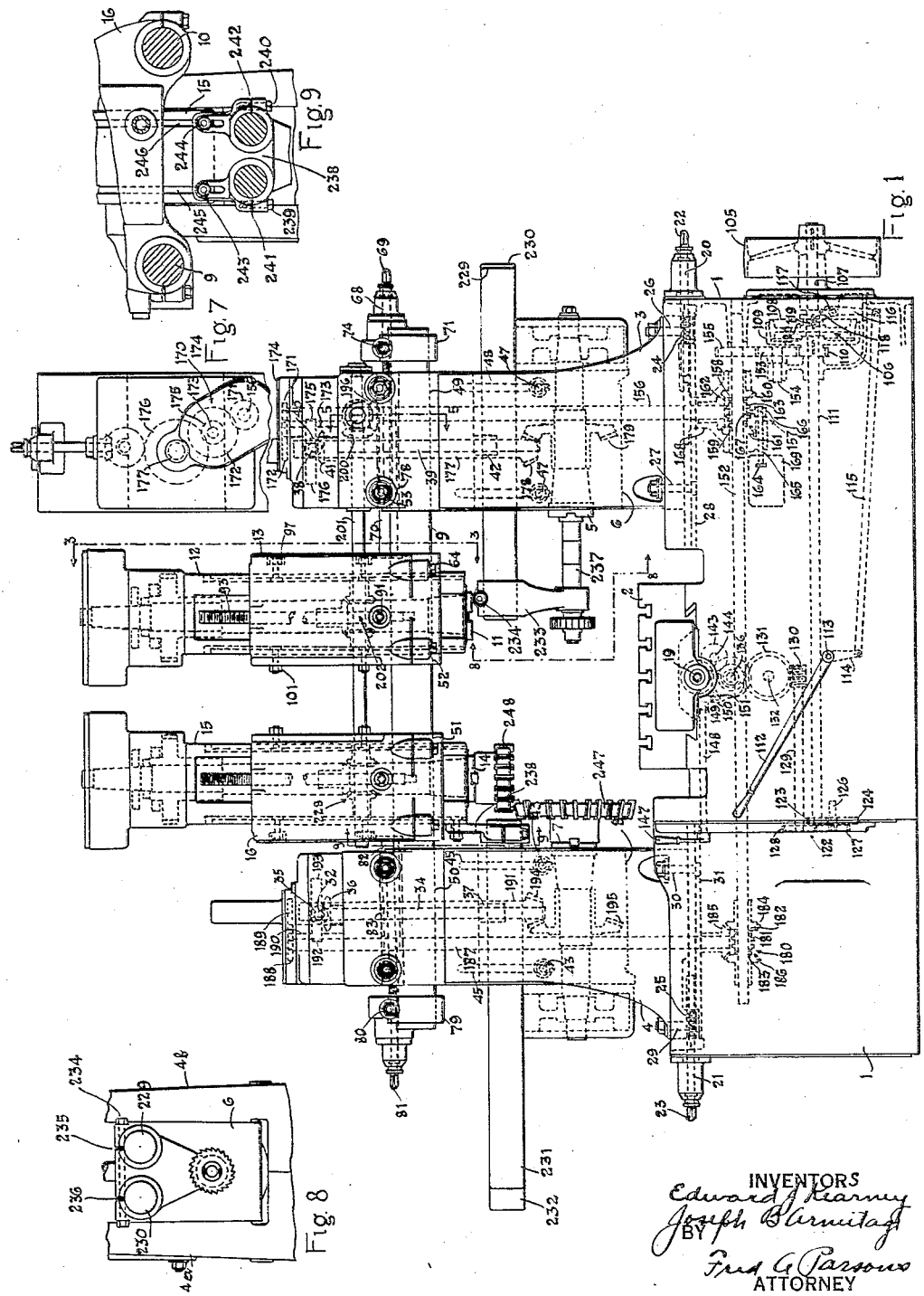
Fig. 1 is a side elevation of a milling machine in which the invention is incorporated.
Figure 2:
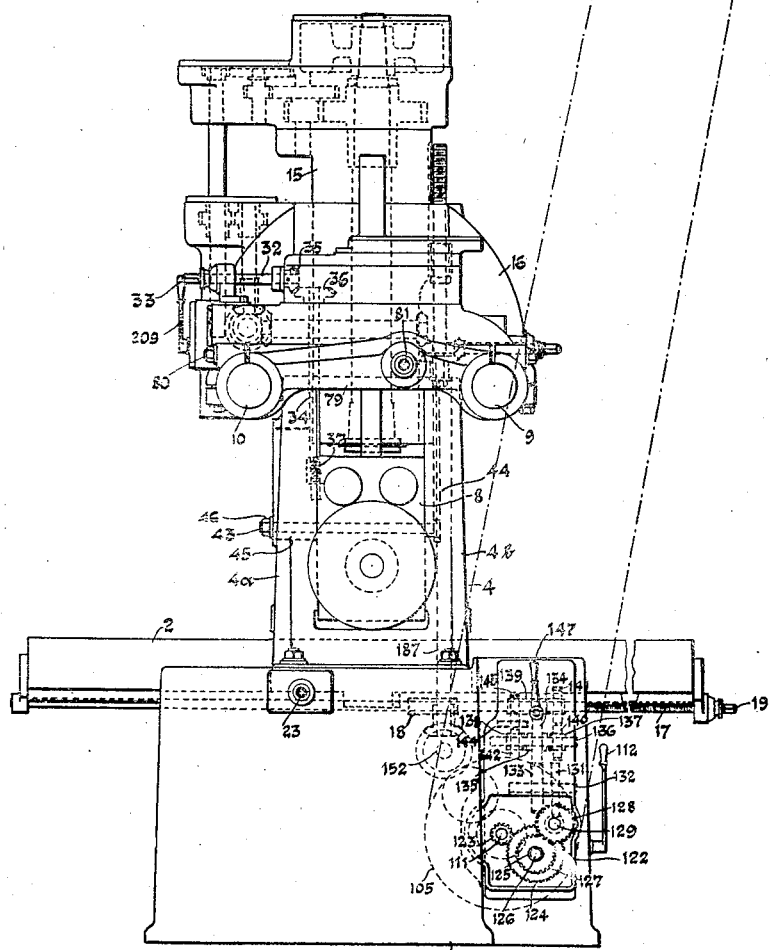
Fig. 2 is an elevation of the same machine in another view, taken from the left in Fig. 1.

The machine includes a stationary base or bed 1, a table or work support 2 slidably guided thereon for movement to right or left in Fig. 2, a head or support 3 slidably guided on the bed at one side of table 2 for movement to right or left in Fig. 1, a head or support 4 slidably guided on the bed at the other side of the table for movement also to right or left in Fig. 1, a spindle 5 rotatably supported in a spindle carrier or support 6 guided from head 3 for vertical movement, a spindle 7 rotatably supported in a carrier or support 8 guided from head 4 for vertical movement, a supporting and bracing device including members 9–10 connecting heads 3–4 at an upper level over the table, a spindle 11 rotatably supported in a carrier or support 12 slidably guided from a head or support 13 for vertical movement, head 13 being slidably guided from members 9–10 for movement to right or left in Fig. 1, and a spindle 14 rotatably supported in a carrier or support 15 slidably guided for vertical movement in a head or support 16 which in turn is slidably guided from members 9–10 for movement to right or left in Fig. 1.

The slides whereby table 2 is guided on bed 1 may be of any suitable form of which several are well known and therefore will not be described in detail. Table 2 may be manually moved by the means of a screw 17 rotatably supported but prevented from axial movement relative to table 2 and threaded in a nut 18, Fig. 2, fixed with the bed, the screw having an end 19 squared to receive a crank, not shown, and may also be moved by power mechanism later described.

The slides whereby heads 3–4 are guided on bed 1, may be of any suitable form of which several are well known and will not be described in detail. Each of the heads may be manually adjusted by mechanism similar for both, consisting of screws 20–21, Fig. 1, rotatably supported from bed 1, but prevented from axial movement relative thereto and having squared ends 22–23 adapted to receive suitable hand cranks not shown, the respective screws being in threaded engagement with nuts 24–25, which are respectively fixed with the heads 3 and 4. The heads may be clamped rigidly with bed 1 in any position of adjustment by the means of the bolts 26-27, Fig. 1, for the head 3 engaging a T slot 28; and bolts 29-30 for the head 4 engaging a T slot 31, the clamps shown being also duplicated on the other or hidden side of the heads in Fig. 1.

The slides whereby the carriers 6-8 are guided for vertical movement in heads 3-4 respectively are similar to the slides shown for similar carriers in a previous application Serial No. 254,970, filed February 17, 1928, and hence will not be described in detail. It may be stated that the carriers move up or down between guide portions of the heads spaced apart similarly to the portions 4a—4b of head 4 in Figs. 2 and 8 and each carrier may be vertically adjusted by any suitable means which as here shown is as follows: For the carrier 8, a shaft 32, Figs. 1-2, having an end 33 squared to receive a suitable crank, not shown, is rotatably supported from head 4 and connected with a screw 34 by the means of meshed bevel gears 35-36. Screw 34 is rotatably supported from head 4 but prevented from axial movement, and engages a nut 37 fixed with the carrier 8. For carrier 6 similar adjusting means is provided consisting of shaft 38, screw 39, bevel gears 40-41, and nut 42, Fig. 1.

Carrier 8 may be clamped in any position of vertical adjustment by clamp means including T bolts 43, Figs. 1-2, movable with the carrier, the heads of which engage in T slots 44 in the one portion 4b of head 4, there being slots 45 permitting movement of the bolts in the other head portion 4a. When a nut 46 is set forward by a suitable wrench, not shown, the head portions 4a and 4b will be sprung the minute amount necessary to bind against the closely fitted carrier, thereby making carrier 8 and head 4, in effect a unitary structure of which the separate parts tend to mutually stiffen and support the others against deflection. Similar clamp means is provided for carrier 6, of which the T bolts 47 and slots 48 are shown in Fig. 1.

The members 9-10 are each slidable in suitable guides in each of the heads 3-4, and in the heads 13-16, and may be clamped with each head. The members 9-10 are in this case round bars, and the guides in each head consist of aligned bores. The bores of the heads 3-4 are aligned by the guiding of these heads on the mutual support or base 1 and serve to align the members 9-10 with reference to the base 1. The heads 13-16 are provided with suitable guides to receive the members 9-10, in this case consisting also of closely fitted bores, and the members 9-10 being themselves aligned as described serve to align the heads 13-16 relative to the other structure.

The bores for the members 9-10 in heads 3-4 are typified by the bores 49-50, Fig. 1, for member 9, and the bores for the members in the heads 13-16 are typified by the bores 51-52, Fig. 1, for member 9.

Each member 9-10 has associated with each head 3-4 clamp means for fixing the relative position of the head and member. Such clamp means is typified by clamps shown for head 3, in Figs. 1-5. For member 9, a clamp bolt 53 is threaded in a bushing 54 slidably closely fitted in a bore 55 which intercepts the bore 49. The clamp bolt passes through another bushing 56 also slidably fitted in bore 55. When bolt 53 is suitably turned bushings 54-56 will be drawn together forcing surfaces 57-58 thereon into angular contact with member 9, thereby binding the member and bushings in their bores, and preventing relative movement of member 9 and head 3. For member 10 a similar construction including bolt 59 and bushings 60-61 in bore 62 is similarly operative.

Each member 9-10 has clamp means associated with each head 13-16. Such clamp means is typified by clamps shown for head 13, in Figs. 1-3. For member 9 the bore 52 is slotted as at 52a and a clamp bolt 64 threaded in the head 13 when turned by a suitable wrench, not shown, springs a portion 65 of the metal surrounding the bore to contract the bore and bind the member therein. For member 10, a similar construction including a bolt 66 and a slot 67 in the bore is similarly operative.

The head 13 may be adjusted along the guiding members 9-10 by the means of a screw 68, Figs. 1-4, having a squared head 69 to receive a suitable crank, not shown, and threaded in a nut member 70 fixed with head 13. Screw 68 is rotatably supported and prevented from axial movement relative to a bracket member 71 adjustably guided for movement along the members 9-10 by the means of bores 72-73, and clampable in position on the members by the means of bolts 74-75, which may contract bores 72-73 to bind the members by virtue of slots 76-77. The screw 68 and nut member 70 pass freely through a suitable bore 78 in head 3.

The head 16 may be adjusted along the guiding members 9-10 by the means of mechanism similar to that for adjusting head 13 and including a bracket 79 adjustable on members 9-10 and clampable on the members by bolts such as 80, and rotatably supporting a screw 81 fixed against relative axial movement, a screw 81 engaging a nut member 82 fixed with head 16 and the screw and nut member passing freely through a bore 83 in the head 4.

The carrier 12 is constructed to be adjustably guided by head 13. The carrier is in this case given a substantially square exterior form, Figs. 1-3-4, having sides 84-85 slidably fitted against rigid surfaces of head 13, and another side 86 against which a removable head member 87 is closely but slidably fitted, member 87 being rigidly retained by bolts such as 88 against mutual pressure surfaces which may be resurfaced to compensate for wear, or for purposes of original fitting, whereby member 87 is in effect a gib. Another side 89 of carrier 12 slides against an adjustable gib 90, gib 90 being adjustable according to any of several well known methods to take up lost motion between head 13 and carrier 12 in a direction transverse to that in which plate 87 is similarly operative.

Carrier 12 may be adjusted in head 13 by the means of a shaft 91, Figs. 1-3, having an end portion 92 squared to receive a crank, not shown, and a screw 93 connected to be moved from shaft 91 by bevel gears 94-95, the screw 93 being rotatably fixed against axial movement relative to head 13 and threadedly engaging a nut 96 fixed with carrier 12.

Carrier 12 may be rigidly clamped with head 13 in any position of its relative adjustment, there being T bolts 97-98, Figs. 1-3-4, engaging T slots 99-100 respectively, and also T bolts 101-102, Fig. 4, engaging T slots 103-104 respectively.

Carrier 15 and head 16 are of a construction for purposes of relative adjustment and clamping, exactly similar to the construction of carrier 12 and head 13 just described which therefore will not be described in detail.

A suitable power source such as a pulley 105, Fig. 1, drives the various transmission trains of the machine through a main clutch generally denoted by the numeral 106, the pulley being fixed on a shaft 107 to which is slidably keyed a clutch member 108 adapted, when moved to the left in Fig. 1, to engage a complementary clutch member 109 which is fixed with a gear 110 fixed on a shaft 111. Clutch 106 may be operated by a lever 112, Fig. 1, fixed on a shaft 113, to which is also fixed a lever 114 connected by the means of a pivoted rod 115 with a lever 116 pivoted at 117, and having an arm 118 with a pivoted shoe 119 engaging an annular groove 120 in the hub of the slidable clutch member 108.

Shaft 111 is connectible with table screw 17 to move the table 2. The extended end of the shaft drives a rate changer generally denoted by the numeral 122, Figs. 1-2, consisting of a meshed gear pair 123-124 interchangeably keyed on the end of shaft 111 and a sleeve 125 rotatable on a stud 126, a second gear pair 127-128 being interchangeably keyed on the same sleeve 125 and on the end of a shaft 129. The gears of the individual pairs are of different size and therefore when interchanged in position of different driving effect whereby the two pairs may give four feed changes according to the positions of the gear pairs.

The shaft 129 has fixed thereon a worm 130 meshing with worm wheel 131 fixed on a shaft 132 upon which is also fixed a gear 133. Gear 133 engages a gear 134 fixed on a clutch member 135 slidably rotatable on a stud 136 upon which clutch members 137-138 are rotatably arranged at opposite ends of the clutch member 135. The clutch member 135 has clutch teeth at each end adapted to engage complementary clutch teeth on the one or the other members 137-138 according to the direction in which member 135 is shifted. A sleeve 139 provides a bore within which screw 17 is slidably keyed and may be driven from clutch member 137 in the one direction through gears 140-141 respectively fixed on member 137 and on the sleeve, or may be driven in the other direction through a gear 142 fixed on member 138, an idler 143 rotatable on a stud 144 and a gear 145 fixed on sleeve 139, the direction being determined by the engagement of clutch member 135 with the one or the other clutch member 137 or 138. The various parts just described constitute a shiftable reverser which may be operated by the means of a lever 147, Fig. 2, fixed on a shaft 148 upon which is also fixed a segment 149 engaging suitable rack teeth in a fork member 150 slidable on a rod 151 and engaging the sides of gear 134. By the means of the mechanism described, table 2 may be driven from pulley 105 in either direction and at a variety of feed rates.

The spindle 5 may be driven from pulley 105 through clutch 106 and gear 110 previously described. Gear 110 drives a shaft 152, Fig. 1, through an idler 153 rotatable on a stud 154 and a gear 155 fixed on the shaft 152. Shaft 152 drives a shaft 156 through a reverser generally denoted by numeral 157, consisting of clutch members 158-159 rotatable on shaft 152 and connected for opposite rotation by the means of bevel gears 160-161-162, the clutch members being spaced apart for a clutch member 163, slidably keyed on shaft 152. Clutch member 163 has clutch teeth at each end adapted for engagement with complementary clutch teeth on members 158 or 159 accordingly as member 163 is shifted in the one or the other direction. Member 163 may be shifted by the means of a hand grip 164 on a rod 165 upon which is fixed a shifter member 166 engaging an annular groove 167 in the member 163. The various gears and clutch members and the shifting device constituting the reverser 157 are carried by a bracket 168 fixed underneath head 3 for bodily movement with the head there being an opening 169 in the wall of the base for access to the hand grip 164. The bevel gear 162 is fixed to shaft 156 whereby the reverser is effective thereon and shaft 156 extends upwardly to the top of head 3 to there drive a rate changer generally denoted by the numeral 170, Fig. 7, consisting of a pair of gears 171-172 interchangeably keyed on the ends of shaft 156 and a driven shaft 173. The gears 171–172 being of different diameter effect different rates on the driven shaft 173 when interchanged in position and still other rates may be effected by the use of other pairs of still different ratio. A cover 174 is removable for the purpose of interchanging gears 171–172. Fixed on shaft 173 is a pinion 175 meshing with a gear 176 slidably keyed on a shaft 177 which is axially movable with the carrier 6 and has fixed on the lower end a bevel gear 178 meshing with a bevel gear 179 fixed on spindle 5.

The spindle 7 may also be driven from pulley 105, through clutch 106, gears 110, 153–155 and shaft 152 previously described, shaft 152 being extended to drive a reverser generally denoted by numeral 180, Fig. 1, and including an intermediate clutch member 181 slidably keyed on shaft 152, clutch members 182–183 rotatable on shaft 152 and connected by bevel gears 184–185–186, the reverser having a supporting bracket for bodily movement with head 4 and shifting mechanism, not shown, and being in all respects similar to the reverser 157 previously described. The bevel gear 185 is fixed on a shaft 187, the upper end of which drives a rate changer consisting of an interchangeable gear pair 188–189 and driving a shaft 190 which drives a shaft 191 through a gear pair 192–193 and has fixed thereon a bevel gear 194 meshing with a gear 195 fixed on spindle 7, all in a manner similar to the driving mechanism of spindle 5 previously described.

Spindle 11 in carrier 12 may be driven from pulley 105 through clutch 106, gears 110–153–155, shaft 152, reverser 157 and shaft 156, Fig. 1, previously described. Shaft 156 has fixed thereon a bevel gear 196, Fig. 1, meshed with a bevel gear 197, Fig. 5, fixed on a shaft 198 having also a bevel gear 199 fixed thereon and meshing with a bevel gear 200, Figs. 1–5–6, fixed on a shaft 201 extended parallel with the movement of heads 13–16 on arms 9–10. Shaft 201 drives a reverser generally denoted by numeral 202, Figs. 1–3–4, consisting of a clutch member 203 slidably keyed on shaft 201, to engage suitable clutch teeth on the one or the other end of member 203 with complementary clutch teeth on the one or the other clutch members 204 or 205. Clutch members 204–205 are connected by bevel gears 206–207–208 whereby gear 207 is revolved in the one or the other direction according to which of the clutch members 204–205 is engaged by clutch member 203. Clutch member 203 may be shifted by the means of a lever 209, Fig. 3, fixed on shaft 210 upon which is also fixed a lever 211 having a pivoted shoe 212 engaging a suitable annular groove 213, Fig. 4, in the clutch member. Bevel gear 207 is fixed on a shaft 214, Fig. 3, upon which is also fixed a gear 215 meshing with a gear 216 slidably keyed on a shaft 217 which is axially movable with carrier 12. Shaft 217 drives a rate changer generally denoted by the numeral 218, Fig. 3, consisting of a pair of gears 219–220 interchangeably keyed on the ends of shaft 217 and a shaft 221, a cover 222 being removable for changing the gears. Gears 219–220 are of different diameter and therefore provide different rates of the driven shaft 221 when reversed in position, and may also be replaced by other gear pairs of still different rate change effect. Shaft 221 has fixed thereon a gear 223 meshing with a gear 224 rotatable on stud 225 together with a gear 226 fixed with gear 224 and meshed with a gear 227 fixed on spindle 11.

Spindle 14 in carrier 15 may be driven from pulley 105 through transmission mechanism including clutch 106, gears 110–153–155 shaft 152, reverser 157, shaft 156, bevel gears 196–197, shaft 198, bevel gears 199–200 and shaft 201, previously described. The shaft 201 is extended and drives a reverser for spindle 14 generally denoted by the numeral 228, Fig. 1. This reverser and its operating mechanism is similar to the reverser for spindle 11 previously described, and drives the spindle 14 through connecting mechanism including a rate changer and all exactly similar to the previously described mechanism connecting reverser 202 with spindle 11 which therefore will not be described in detail.

Each of the carriers 6–8 provides an overarm device bodily movable with the carrier. For the carrier 6 the overarm device in this case includes a plurality of arms 229–230, Figs. 1–8, and for the carrier 8 the overarm device includes arms 231–232. The overarms are in this case round bars and are guided for axial adjustment in suitable bores in the carriers and may be clamped by any suitable means, not shown, in any position of such adjustment. Such arms movable with the carriers are variously useful. In Figs. 1–8, there is illustrated a use in which the arms bodily movable with carrier 6 support a pendant 233 fixed thereon by the means of a bolt 234 adapted to spring portions of the pendant bores to clamp on the arms, the bores being slotted for this purpose as at 235–236. Pendant 233 engages the end of an arbor 237 fixed with spindle 5 to project over table 2. The construction is such that the alignment of arbor 237 and spindle 5 is maintained during any adjustment of carrier 6 or of head 3. In Figs. 1–9 there is illustrated a different use of the arms movable with the carriers. In this case the arms 231–232 have fixed thereon a bracket 238 clamped by the means of bolts 239–240, adapted to contract the arm bores in the bracket, the bores being slotted as at 241–242 for this purpose.

Bracket 238 provides a face or surface in the direction of carrier 15 and in any position of head 16 along arms 9–10, arms 231–232 may be adjusted in carrier 8, together with bracket 238, for the face of the bracket to stand against the face of the carrier 15. Carrier 15 as previously noted provides T slots for the purpose of clamping with head 16, and the bracket 238 provides T bolts 243–244 engaging the T slots 245–246 in carrier 15, whereby in any vertical position of carrier 15 the bracket 238 may be rigidly fixed with the carrier. The construction just described is of value when the adjacent horizontal and vertical spindles such as 7–14 carry heavy cutters such as 247–248. In such case the cutting strains are more rigidly supported by the use of bracket 238, supplementing the other supporting structure by providing a direct and rigid connection fixing together the carriers of the two spindles. Another valuable use of bracket 238 is for the better support of the lower end of carrier 15 when the operation requires the carrier to be moved downward to project considerably from head 16. In such case the carrier 8 may be moved down for bracket 238 to support the projecting end of carrier 15 at a point considerably more effective than the support received from head 16. Such use will be obvious but is not specifically illustrated since it is similar to the use shown. Brackets such as 238 and pendants such as 233 may be associated with either carrier 6–8 and the bracket and pendant shown are interchangeable on the different carriers 6–8.

In a milling machine having horizontal and vertical spindles each adjustable for finishing a wide variety of work on different work faces at the same cutting stroke, it is desirable at times to interlock cutters on the different spindles as illustrated for cutters 247–248, Fig. 1, whereby each cutter interferes with or passes into the zone of the other. This is made possible for a variety of cutters and conditions by providing both spindles with drive trains having a common drive source but individually operative rate changers, as described. In such case each cutter may be operated at substantially the best speed yet the speeds may be synchronized for the blades of the one cutter to pass between the spaces of the other cutter.

What is claimed is:

1. In a milling machine the combination of a bed, a table reciprocably supported therefrom, a plurality of supports carried by said bed respectively adjacent opposite edges of said table, a member above said table connecting said supports and horizontally adjustable relative thereto, clamp means operative between said supports and member for fixing the relative positions thereof, a cutter head adjustably guided on said member for horizontal movement between said supports, and clamp means for fixing the position of said head on said member.

2. In a milling machine the combination of a bed, a table reciprocably supported therefrom, a plurality of supports carried by said bed and respectively uprising at opposite sides of said table, a member horizontally adjustable above said table, said supports each having guides for said member and in permanent mutual alignment whereby to support said member at each end thereof and in various positions of horizontal adjustment, clamp means operative between said member and said supports for fixing the relative positions thereof, a cutter head guided on said member for horizontal adjustment between said supports, means for adjusting said cutter head, and clamp means for fixing the relative position of said cutter head and members.

3. In a milling machine, the combination of a bed, a table reciprocably supported therefrom, a cutter spindle positioned above said table, and supporting means for said cutter spindle including a head supported from said bed adjacent an edge of said table and guided for movement in a direction transverse to table movement, a member supported directly from said head for adjustment therewith and projecting over said table at a height fixed in relation thereto, a carrier rotatably supporting said spindle and horizontally adjustably guided on said member, and clamp means for fixing the positions of adjustment of said head and carrier.

4. In a milling machine the combination of a bed, a table reciprocably supported therefrom, a cutter spindle positioned above said table, and supporting means for said spindle including a head supported from said bed for adjustment in a direction transverse to table movement and uprising adjacent a longitudinal edge of said table, a member supported directly from said head for bodily movement therewith and projecting over said table, a carrier rotatably supporting said spindle and supported from said member for horizontal adjustment in a direction transverse to table movement, and clamp means for fixing the position of adjustment of said head and carrier.

5. In a milling machine, the combination of a bed, a table reciprocably supported therefrom, a cutter spindle positioned above said table, and supporting means for said spindle including a head supported from said bed for adjustment in a direction transverse to table movement and uprising adjacent an edge of said table, a member supported directly from said head for bodily movement therewith and for horizontal adjustment relative thereto, a carrier rotatably supporting said spindle and supported from said member for adjustment in a direction transverse to table movement, and clamp means for fixing the position of adjustment of said head, member and carrier.

6. In a milling machine the combination of a bed, a table reciprocably supported therefrom, a head supported from said bed adjacent an edge of said table for adjustment transverse to the movement of said table, a carrier supported directly from said head for bodily movement therewith and for vertical adjustment relative thereto, a cutter spindle rotatably supported from said carrier for bodily movement therewith, a member adjustably supported directly from said head for bodily movement therewith and projecting over said table, a second carrier supported from said member for bodily movement with said head and member and for adjustment relative thereto in a direction transverse to table movement, a cutter spindle rotatably supported from said second carrier for bodily movement therewith, and clamp means for fixing the positions of adjustment of said head, member and carriers.

7. In a milling machine, the combination of a bed, a table reciprocably directly supported therefrom, a head adjustably supported from said bed for movement in a direction transverse to table movement, a cutter spindle rotatably supported from said head for vertical adjustment, a member supported from said head and horizontally adjustable relative to said head to extend over said table and at a fixed height relative thereto, and a second cutter spindle rotatably supported from said member.

8. In a milling machine the combination of a bed, a table reciprocably supported therefrom, a plurality of supports uprising from said bed respectively at opposite sides of said table, one of said supports being horizontally adjustable relative to said table in a direction transverse to table movement, a cutter spindle rotatably supported from the last mentioned of said supports for vertical adjustment relative thereto, a plurality of members each connecting between said supports at a fixed height above said table and spaced apart in the direction of table movement, said members being adjustable relative to said adjustable support to permit adjustment of such support independently of said members, and a spindle rotatably supported from said members between said supports and above said table in a position for the axis thereof to pass between said members.

9. In a milling machine, the combination of a bed, a table reciprocably supported therefrom, a head adjacent a longitudinal edge of said table and comprising two portions spaced apart in the direction of table movement, a carrier vertically movable between said head portions, a horizontal spindle rotatably supported from said carrier and with its axis in a vertical plane transverse to the travel of said table, a plurality of members supported from said head above said table and spaced on opposite sides of said vertical plane, and a vertical spindle rotatably supported from said members and with its axis positioned between said members and substantially coinciding with said vertical plane.

10. In a milling machine, the combination of a bed, a table reciprocably supported therefrom, a plurality of uprising supports supported from said bed respectively at opposite sides of said table and each adjustable relative thereto in a direction of mutual parallelism and transverse to the direction of table movement, a carrier supported from one of said supports and vertically adjustable relative thereto, a carrier supported from the other of said supports and vertically adjustable relative thereto, a rotatable cutter spindle bodily movable with one of said carriers, a rotatable cutter spindle bodily movable with the other of said carriers, and a member mutually bracing said supports at a fixed spacing above said table, said member being adjustable relative to each of said supports in a direction of mutual parallelism with the support adjustment, whereby either of said supports may be adjusted without disturbing the other support and said member.

11. In a milling machine, the combination of a bed, a table reciprocably supported therefrom, a plurality of supports respectively uprising on opposite sides of said table and each supported from said bed for adjustment in mutual parallelism and in a direction transverse to table movement, a carrier supported from one of said supports and vertically adjustable relative thereto, a carrier supported from the other of said supports and vertically adjustable relative thereto, a rotatable cutter spindle bodily movable with one of said carriers, a rotatable cutter spindle bodily movable with the other of said carriers, a member connecting said supports above said table and slidably guided in each support to permit the independent adjustment of either support, a head supported from said member between said supports for independent adjustment in mutual parallelism with the adjustment of said supports, another carrier supported from said head for adjustment in a direction transverse to the direction of head adjustment, and a cutter spindle rotatably journaled in the last mentioned carrier.

12. In a milling machine, the combination of a bed, a table reciprocably supported therefrom, a plurality of supports uprising at opposite sides of said table respectively and each supported from said bed for adjustment in mutual parallelism and in a direction transverse to the movement of said table, a carrier supported from one of said supports, a carrier supported from the other of said supports, a rotatable cutter spindle bodily movable with one of said carriers, a rotatable cutter spindle bodily movable with the other of said carriers, a plurality of horizontal members each connecting said supports above said table and spaced apart in the direction of table movement, said members each being slidably guided in each of said supports whereby to permit the independent adjustment of either support without disturbing the other support and said members, a head supported from said members between said supports for independent adjustment in a direction of mutual parallelism with said support adjustment, another carrier supported from said head for adjustment in a path positioned between said members, and a cutter spindle rotatably journaled in the last mentioned carrier.

13. In a milling machine the combination of a bed, a table reciprocably supported therefrom, a plurality of supports each supported from said bed and respectively uprising at opposite sides of said table, one of said supports being adjustable in a direction transverse to table movement, a carrier supported from said adjustable support for vertical movement relative thereto, a rotatable spindle bodily movable with said carrier, an arbor fixed with said spindle to project over said table, an overarm device supported from said carrier for bodily movement therewith and having a portion engaging the projecting end of said arbor whereby to maintain alignment of said arbor and spindle during adjustment either of said carrier or of said head, a member connecting between upper portions of said supports and adjustable relative to said adjustable support and in parallelism with the direction of adjustment thereof whereby the adjustable support may be adjusted without disturbing the other support and said member, a head supported from said member between said supports and above said table for adjustment in parallelism with the direction of movement of said adjustable support, and a spindle rotatably supported from said head.

14. In a milling machine the combination of a bed, a table reciprocably supported therefrom, a plurality of supports each supported from said base for adjustment in mutually parallel paths transverse to table movement and respectively uprising at opposite sides of said table, a member connecting said supports at a fixed height above said table, said member being adjustable relative to each support in a direction parallel with the direction of adjustment of each support, whereby either support may be moved without disturbing the other support or said member, clamp means for rigidly fixing said member with each support, a carrier supported from one of said supports for vertical adjustment relative thereto, a rotatable spindle bodily movable with said carrier, an arbor fixed with said spindle to project over said table, and an overarm device bodily movable with said carrier and having a portion engaging the projecting end of said arbor, whereby to maintain the alignment of said arbor with said spindle during vertical adjustment of said carrier and also during adjustment of the support with which said carrier is associated.

15. In a milling machine the combination of a bed, a table reciprocably supported therefrom, a plurality of supports each supported from said bed and respectively uprising at opposite sides of said table, one of said supports being adjustable in a direction transverse to the movement of said table, a carrier supported from said adjustable support for vertical movement relative thereto, a rotatable spindle bodily movable with said carrier, an arbor fixed with said spindle to project over said table, an overarm device bodily movable with said carrier and having a portion engaging the projecting end of said arbor, whereby to maintain alignment of said arbor and spindle during adjustment either of said carrier or support, and a member connecting said supports at an upper level thereof above said table, said member being adjustable relative to said adjustable support in parallelism with the adjustment thereof, whereby said support may be adjusted without disturbing said member, and clamp means for rigidly fixing said member with each of said supports in various positions of said adjustment.

16. In a milling machine the combination of a bed, a table supported therefrom for reciprocatory movement, a plurality of supports each supported from said bed for adjustment in mutually parallel paths transverse to the direction of table movement and respectively uprising at opposite sides of said table, a carrier supported from one of said supports for vertical movement relative thereto, a rotatable spindle bodily movable with said carrier, an arbor fixed with said spindle to project over said table, an overarm device bodily movable with said carrier and having a portion engaging the project ing end of said arbor whereby to maintai alignment of said arbor and spindle dui ing the adjustment either of said carrier or of the support associated therewith, a member connecting said supports for the mutual stiffening thereof at an upper level above said table, said member being adjustable relative to each support in a direction parallel with support adjustment whereby either support may be adjusted without disturbing the other support and said member, a head supported from said member between said supports, and a spindle rotatably supported from said head.

17. In a milling machine, the combination of a bed, a table supported therefrom for reciprocatory movement, a plurality of supports each supported from said bed for adjustment in mutually parallel paths transverse to table movement and respectively uprising on opposite sides of said table, a member connecting said supports for the mutual stiffening thereof at an upper level above said table and adjustable relative to each of said supports in a direction parallel with support adjustment, whereby either support may be adjusted independently without disturbing the other support and said member, a head supported from said member between said supports for adjustment in a direction parallel with the adjustment of said member, a carrier supported from said head for adjustment relative thereto and transverse to the direction of head adjustment, a spindle rotatably supported from said carrier, a carrier directly supported from one of said supports for vertical adjustment relative thereto, an arbor rotatably supported from the last mentioned carrier for bodily movement therewith and to project over said table, and a support for the projecting end of said arbor including an overarm supported from the last mentioned carrier for bodily movement therewith.

18. In a milling machine the combination of a bed, a table supported therefrom for reciprocatory movement, a plurality of supports respectively adjacent opposite sides of said table, a plurality of carriers one of which is supported from one of said supports for vertical movement relative thereto and the other of which is similarly supported from the other support, a plurality of rotatable spindles one of which is associated with one of said carriers and the other of which is associated with the other carrier, a plurality of overarm devices one of which is bodily movable with one of said carriers and the other of which is bodily movable with the other carrier whereby to be adapted to maintain a supporting relationship with tools carried by different of said spindles during adjustment of the different carriers, and a member rigidly connecting said supports at a level above said table and above said carriers for the mutual stiffening of said supports.

19. In a milling machine, the combination of a bed, a table supported therefrom for reciprocatory movement, a plurality of supports each supported from said bed for adjustment in mutually parallel paths transverse to the direction of table movement and respectively on opposite sides of said table, a plurality of carriers one of which is supported from one of said supports for vertical movement relative thereto and the other of which is similarly supported from the other support, a plurality of rotatable spindles one of which is bodily movable with one of said carriers and the other of which similarly bodily movable with the other carrier, a plurality of overarm devices one of which is bodily movable with one of said carriers and the other of which is bodily movable with the other carrier whereby the different overarm devices are adapted to maintain a supporting relationship with tools carried by the different spindles during adjustment of the different carriers and also of the different supports, a member connecting said supports for the mutual stiffening thereof at an upper level above said table and carriers and adjustable relative to each of said supports in a direction parallel with support adjustment, whereby either support may be adjusted independently without disturbing said member and the other support, a head supported from said member between said supports for adjustment in a direction parallel with the adjustment of said member, a carrier supported from said head for adjustment transverse to the head adjustment, and a spindle rotatably supported from the last mentioned carrier.

20. In a milling machine, the combination of a reciprocable table, a tool spindle rotatable adjacent a longitudinal edge of said table, another tool spindle rotatable above said table, and transmission mechanism including a main clutch providing an interruptible power source, a train connecting said clutch and one of said spindles, and a plurality of other trains each connected with the first named train at an intermediate point thereof and respectively connected with the other of said spindles and said table, each of said trains including shiftable reversing means.

21. In a milling machine the combination of a reciprocable table, a plurality of rotatable tool spindles adjacent said table, one of which is adjacent a longitudinal table edge and the other above said table, and transmission mechanism including a shiftable motion interrupting main clutch providing a power source, a train connecting said clutch, a motion reverser, a rate changer, and one of said spindles in the order recited, and a second train connected with the first named train at a point between said reverser and rate changer and including a motion reverser, a rate changer and the other of said spindles.

22. In a milling machine, the combination of a reciprocable table element, a plurality of rotatable tool spindle elements respectively adjacent a longitudinal edge of said table element and above said table element, and transmission mechanism including a common drive source for all said elements, reverser means driven from said source and operable for individually reversing each of said elements, and rate change means driven from said source and operable to individually change the rate of each of said elements, whereby each of said elements may be independently actuated from said source as to direction and rate of movement.

23. In a milling machine, the combination of a reciprocable table, a first tool spindle rotatable adjacent a longitudinal edge of said table, a second and third spindle each rotatable above said table, and transmission mechanism including a shiftable motion interrupting clutch providing a power source, a first train connecting said source, a first motion reverser and said first spindle in the order recited, a second train connecting with said first train at a point between said reverser and first spindle and including said connecting point, a second reverser and said second spindle in the order recited, and a third train including a reverser for driving said third spindle and connected at a point affected by said first reverser but unaffected by said second reverser.

24. In a milling machine the combination of a bed, a table reciprocably supported therefrom, a horizontal tool spindle supported from said bed adjacent a longitudinal edge of said table for bodily adjustment in a plurality of mutually transverse paths each transverse to the path of table movement, a vertical tool spindle supported from said bed at a level above said table for bodily adjustment in a plurality of mutually transverse paths each transverse to the path of table movement, a power source, a plurality of trains each driven from said source and respectively connected for rotation of different of said spindles, and a plurality of rate changers respectively positioned in the different trains to be effective on different of said spindles, each of said trains including reversing means individual to the spindle driven from the train.

25. In a milling machine, the combination of a bed, a table reciprocably supported therefrom, a support supported from said bed for adjustment in a path transverse to table movement and uprising adjacent an edge of said table, a first spindle carrier supported from said support for vertical movement relative thereto, an overarm bodily movable with said first spindle carrier and adjustable relative thereto in the direction of movement of said support, a head supported from said bed above said table for horizontal movement in the direction of movement of said support, a second spindle carrier supported from said head for vertical movement whereby an end thereof projects downwardly adjacent said first spindle carrier, and means other than previously mentioned for rigidly connecting the one spindle carrier with the other, said means being adjustable to permit such connection in various relative positions of said spindle carriers.

26. In a milling machine, the combination of a bed, a table reciprocably supported therefrom, a support supported from said bed and uprising adjacent an edge of said table, a first spindle carrier supported from said support for vertical movement, a head supported from said bed above said table for horizontal movement, a second spindle carrier supported from said head and vertically adjustable for an end thereof to project downwardly adjacent said first spindle carrier, an overarm bodily movable with said first spindle carrier and adjustable relative thereto in the direction of said second spindle carrier, and bracing means for rigidly connecting said overarm with said downwardly projecting end of said second spindle carrier in various positions of the vertical adjustment thereof.

In witness whereof we have affixed our signatures.

EDWARD J. KEARNEY.
JOSEPH B. ARMITAGE.